Feb. 25, 1947.　　A. BOORER　　2,416,512
VALVE GEAR OF INTERNAL-COMBUSTION ENGINES
Filed June 26, 1944
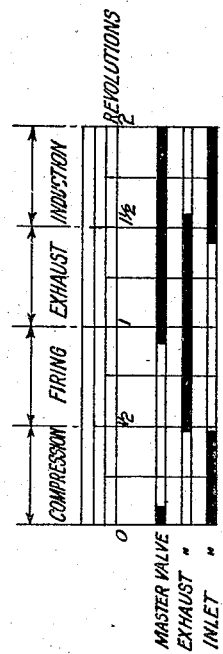
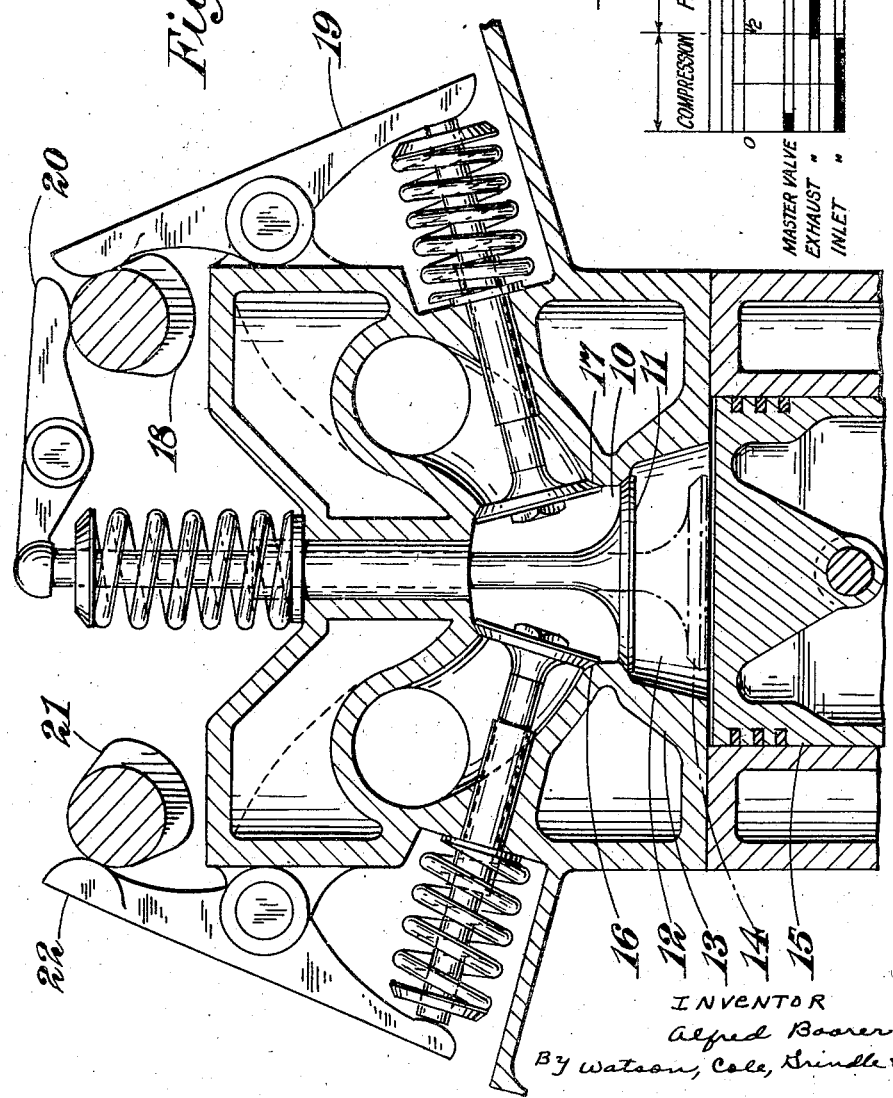
INVENTOR
Alfred Boorer
By Watson, Cole, Grindle + Watson Patented Feb. 25, 1947

2,416,512

UNITED STATES PATENT OFFICE 2,416,512

VALVE GEAR OF INTERNAL-COMBUSTION ENGINES

Alfred Boorer, Sussex, England

Application June 26, 1944, Serial No. 542,205
In Great Britain April 23, 1943

4 Claims. (Cl. 123—79)

The present invention relates to valve gear of internal-combustion engines, of the kind in which a valve chamber containing inlet and exhaust valves may be isolated at appropriate times in the cycle from the engine cylinder, by means of a master valve. One of the difficulties encountered with this kind of arrangement is in obtaining adequate scavenging of the combustion space, and one of the objects of the present invention is to improve such scavenging.

According to this invention, an internal-combustion engine having valve gear of the kind referred to above is characterised in that the master valve and the port it controls are arranged in a cavity in the cylinder head, which cavity constitutes substantially the whole volume of the combustion space at top dead centre, and in that the lift of the master valve is arranged to be such that the head of the valve approaches closely the crown of the piston at top dead centre. Preferably, the lift of the master valve is arranged to be in the direction of the axis of the cylinder.

As is known, the scavenging of the combustion space is effected not only by the expansive force of the gases and the pumping action of the piston, but also by the ejector action of the exhaust gases which when the inlet valve first opens, cause the combustible charge to flow in and displace the exhaust gases. It will be appreciated that this latter action is greatly enhanced by the arrangement of the present invention, owing to the master valve and piston approaching one another closely, since the inflowing combustible charge can sweep out the majority of the combustion space, which is unobstructed by the master valve, and there is little or no dead space between it and the piston.

This scavenging effect of the inflowing combustible gases is further enhanced, according to the present invention, by so shaping and dimensioning the cavity in the cylinder head, that when the master valve is fully opened, the gap between the periphery of its head and the marginal wall of the cavity is not substantially greater than is required for a minimum resistance to flow.

Preferably, the cavity is compact in space, i. e., its cross-sectional area transverse to the axis of the cylinder is comparable with its cross-sectional area in a direction at right-angles; the depth of the cavity, however, in this latter direction being determined by the maximum lift it is practicable to apply to the master valve. It will be appreciated that the capacity of the cavity will be determined by the required compression ratio.

The timing of the inlet, exhaust and master valves is in general such that the master valve commences to open at a point in the cycle usual for the opening of the exhaust valve, but the exhaust valve of the present invention is arranged to be fully opened by that time, while the master valve closes at a point in the cycle usual for the closing of the inlet valve, but the inlet valve of the present invention is still fully open, and does not close until the master valve has been closed for an appreciable period. By this timing, both the scavenging and the volumetric efficiency of the engine is improved.

The following is a description of the invention as applied to a four-stroke internal-combustion engine, reference being made to the accompanying drawing, in which—

Figure 1 shows a section through the upper part of the cylinder and cylinder head with the piston near its outer dead centre, and Figure 2 is a valve timing diagram.

In Figure 1, the valve chamber 10 is shown isolated by a master valve 11, during the compression stroke, from the cavity 12 in the cylinder head 13, which cavity constitutes substantially the whole of the combustion space at outer dead centre.

The position of the master valve during the exhaust stroke at outer dead centre, is indicated by the dotted lines 14, and it will be noted that the valve head approaches closely the crown of the piston 15. Under such conditions, both the inlet valve 16 and exhaust valve 17 will be open, and as explained above, the inertia or ejector action of the exhaust gases flowing from the valve cavity, will draw in the combustible charge which sweeps downwardly through the master valve port into the cavity 12, displacing the remaining exhaust gases through the exhaust valve port. Since the piston approaches closely the head of the valve, there is little or no dead space for trapping the exhaust gases.

When the master valve is closed, the cavity in the cylinder head is of a truncated conical shape of a compact form, and the axial dimension of which is comparable with the diameter, although smaller, owing to the limitations imposed by the maximum lift of the master valve which it is practicable to obtain. The exhaust valve 17 and the master valve 11 are shown operated from a single cam 18 which actuates rockers 19 and 20, engaging the exhaust and master valves respectively. The inlet valve, on the other hand, is separately operated by a cam 21 actuating a rocker arm 22.

Referring to the valve timing diagram as shown in Figure 2, the black areas represent the times during which the valves are open, and it will be noted that the exhaust valve opens when the exhaust cavity is isolated from the cylinder by the master valve, and thus is fully open by the time the master valve opens. The inlet valve opens before the exhaust valve closes, while the inlet valve is still open by the time the master valve closes, so that there is a minimum restriction to flow of the combustible gases during the induction period.

I claim:

1. An internal combustion engine comprising a cylinder, a cylinder head formed with two cavities having a port between them so that one cavity communicates with the cylinder through an opening of smaller area than the cylinder, inlet and exhaust valves in the other cavity, a master valve controlling the port between the cavities, a piston in the cylinder arranged at top dead center to approach closely the mouth of the first said cavity so that the cavity constitutes substantially the whole volume of the combustion space, and valve gear arranged to lift the master valve so that its head approaches closely the crown of the piston.

2. An internal combustion engine comprising a cylinder, a cylinder head formed with two cavities having a port between them so that one cavity communicates with the cylinder through an opening of smaller area than the cylinder, inlet and exhaust valves in the other cavity, a master valve controlling the port between the cavities, a piston in the cylinder arranged at top dead center to approach closely the mouth of the first said cavity so that the cavity constitutes substantially the whole volume of the combustion space and valve gear arranged to lift the master valve so that its head approaches closely the crown of the piston, the shape and dimensions of which cavity and valve are such that when the valve is fully open the gap between the periphery of its head and the marginal wall of the cavity is not substantially greater than is required for minimum resistance to flow.

3. An internal combustion engine comprising a cylinder, a cylinder head formed with two cavities having a port between them so that one cavity communicates with the cylinder through an opening of smaller area than the cylinder, inlet and exhaust valves in the other cavity, a master valve controlling the port between the cavities, a piston in the cylinder arranged at top dead center to approach closely the mouth of the first said cavity so that the cavity constitutes substantially the whole volume of the combustion space and valve gear arranged to lift the master valve so that its head approaches closely the crown of the piston, which first said cavity is compact in shape and is so dimensioned with relation to the master valve that when the latter is fully open the gap between the periphery of its head and the marginal wall of the cavity is not substantially greater than is required for minimum resistance to flow.

4. An internal combustion engine comprising a cylinder, a cylinder head formed with two cavities having a port between them so that one cavity communicates with the cylinder through an opening of smaller area than the cylinder, inlet and exhaust valves in the other cavity, a master valve controlling the port between the cavities, a piston in the cylinder arranged at top dead center to approach closely the mouth of the first said cavity so that the cavity constitutes substantially the whole volume of the combustion space and valve gear arranged to lift the master valve so that its head approaches closely the crown of the piston, and means for timing the inlet, exhaust and master valves so that the master valve commences to open at a point in the cycle usual for the opening of the exhaust valve, but the exhaust valve is arranged to be fully open by that time, while the master valve closes at a point in the cycle usual for the closing of the inlet valve, but the inlet valve is still fully open at that time and does not close until the master valve has been closed for an appreciable period.

ALFRED BOORER.

REFERENCES CITED

The following references are of record in the file of this patent:

UNITED STATES PATENTS

| Number | Name | Date |
|---|---|---|
| 1,171,211 | Keiper | Feb. 8, 1916 |
| 1,304,735 | Blumberg | May 27, 1919 |
| 1,690,384 | Trego | Nov. 6, 1928 |
| 2,103,024 | Smith | Dec. 21, 1937 |
| 2,336,756 | Smith | Dec. 14, 1943 |

FOREIGN PATENTS

| Number | Country | Date |
|---|---|---|
| 302,267 | German | Dec. 11, 1917 |